J. HARTMAN.
FRYING PAN.
APPLICATION FILED AUG. 1, 1916.
1,260,771.
Patented Mar. 26, 1918.
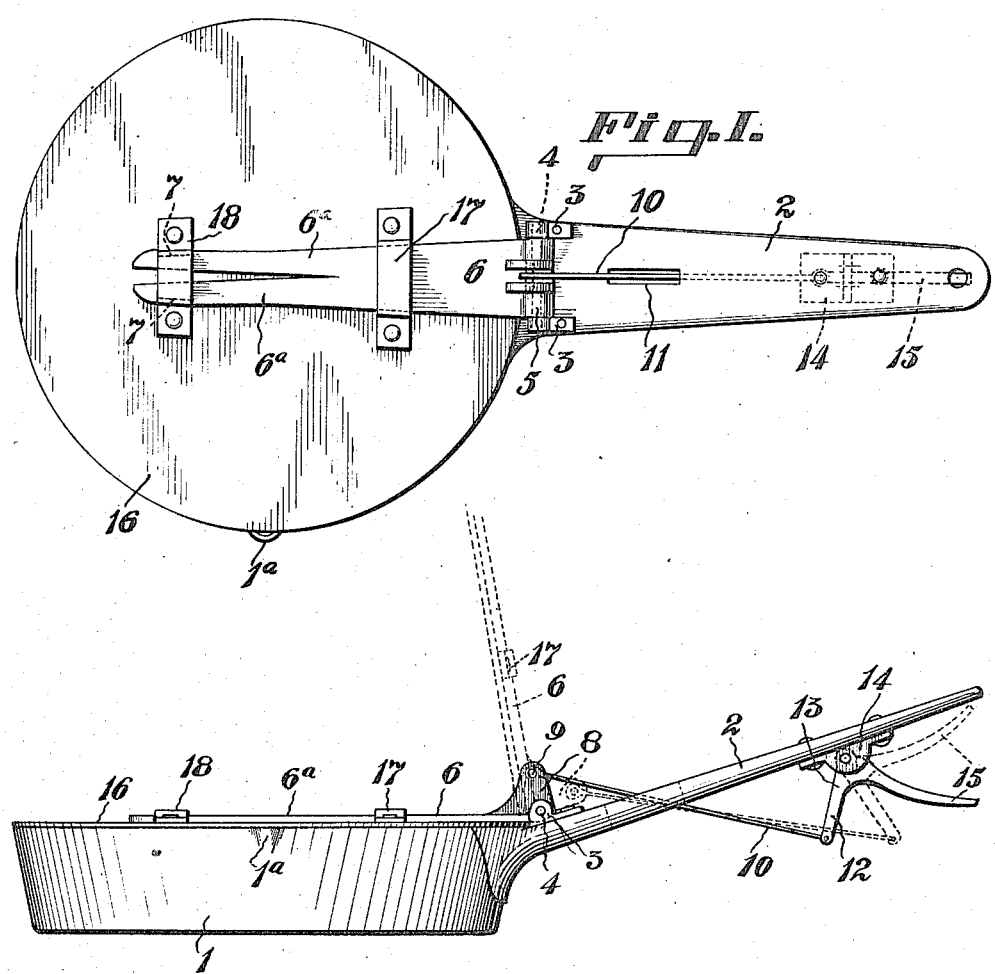
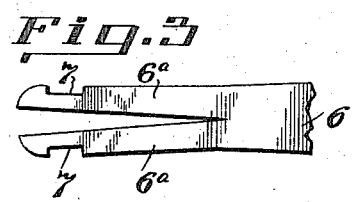
WITNESSES
Thos. F. Knox
H. N. Babcock
INVENTOR
John Hartman
BY Richard B. Owen
ATTORNEY

UNITED STATES PATENT OFFICE.

JOHN HARTMAN, OF BOZEMAN, MONTANA.

FRYING-PAN.

1,260,771.   Specification of Letters Patent.   Patented Mar. 26, 1918.

Application filed August 1, 1916. Serial No. 112,584.

*To all whom it may concern:*

Be it known that I, JOHN HARTMAN, a citizen of the United States, residing at Bozeman, in the county of Gallatin and State of Montana, have invented certain new and useful Improvements in Frying-Pans, of which the following is a specification.

This invention relates to frying pans, and more particularly to a frying pan provided with a cover and means for raising the same.

One of the main objects of the invention is to provide a frying pan having a detachably mounted cover. A further object is to provide simple and efficient means for raising the cover or holding it tightly in position on the pan, as desired. Further objects will appear from the detailed description.

In the drawings:

Figure 1 is a plan view of a pan with the invention applied,

Fig. 2 is a side view of the same.

Fig. 3 is a detail.

1 designates the pan body to which is secured the upwardly inclined handle 2 of any suitable construction. At the lower end of the handle are secured two supporting brackets 3 positioned adjacent the sides of the handle and in horizontal alinement. These brackets rockably support a pivot pin 4 on which is mounted a sleeve 5 formed integral with an outwardly tapering arm 6. The inner portion of this arm is bifurcated to provide two resilient spring arms 6ª which are bent laterally at a slight angle to the body of arm 6. Each of these arms is provided, near its outer end, with an inwardly directed rectangular recess 7. The arm 6 is further provided, at its inner end, with two spaced upwardly projecting lugs 8 formed integral therewith. A pin 9 is secured between these lugs at the upper ends thereof, and a pull rod 10 has its inner end loosely connected to the intermediate portion of this pin. This rod passes through a slot 11 through the handle 2 and has its outer end pivotally connected to the outer end of the arm 12 of a bell-crank lever 13.

The bell crank lever 13 is pivotally mounted in a U bracket 14 secured to the underneath of handle 2 near the outer end thereof. The outer arm 15 of the bell crank lever is at such an angle to the arm 12 that, when raised to its uppermost operative position, it will be approximately parallel with the handle and will fit snugly against the under face thereof.

A disk-like cover 16 is provided for closing the pan body. This cover is provided, on its upper face, with an inner U strap 17 secured thereto, and an outer U strap 18. The inner strap fits snugly about the inner portion of arm 6, and the outer strap receives the outer ends of the spring arms 6ª, the vertical walls of this strap fitting snugly into the recesses 7 of these arms. By this means the cover is detachably secured on the arm 6 and is locked against longitudinal movement thereon.

By raising the arm 15 of the bell-crank lever 13 the arm 6 will be rocked upwardly and inwardly into a vertical position, by means of the pull rod 10, as indicated by broken lines in Fig. 2 of the drawings. By pressing downward on the arm 15 of the bell-crank lever the cover will be held firmly on the pan body 1 so that the contents of the same may be quickly and easily drained by means of the pouring lip 1ª provided on the body for this purpose.

While I have shown my invention as applied to a pan having a handle of standard construction, it will be obvious that it can be equally well applied to a handle of any desired design. It will also be obvious that other changes can be made in my invention without departing from the field and scope of the same, and I intend to include all such variations in this application, as fall within the scope of the appended claim, in which a preferred form of my invention only is disclosed.

What I claim is:

The combination of a pan body, a handle secured thereto and provided with an aperture, an arm pivotally mounted at its outer end on the handle and having its inner end portion bifurcated to form resilient inwardly diverging securing arms, a cover mounted on said body and provided with spaced securing strip members adapted to snugly receive said arm and the resilient securing arms carried thereby so as to detachably secure the cover on the arm, spaced upwardly projecting lugs carried by said arm at the outer end thereof, a bell crank lever pivotally mounted on the handle adjacent the outer end thereof, and a pull-rod projecting through the aperture in the handle and having its inner end loosely connected to said lugs and its outer end pivotally connected to the inner arm of the bell crank lever.

In testimony whereof I affix my signature in presence of two witnesses.

JOHN HARTMAN.

Witnesses:
W. H. AXTELL,
WM. STUVE.